United States Patent
Natarajan et al.

(10) Patent No.: US 10,320,449 B2
(45) Date of Patent: Jun. 11, 2019

(54) DYNAMIC CELL CLUSTERING FOR COORDINATED MULTIPOINT OPERATION

(71) Applicant: Nokia Solutions and Networks Oy, Espoo (FI)

(72) Inventors: Balamurali Natarajan, Bangalore (IN); Anand Bedekar, Glenview, IL (US); Suresh Kalyanasundaram, Bangalore (IN); Rajeev Agrawal, Glenview, IL (US); Xiaoyi Wang, Wheeling, IL (US); Hans Kroener, Geislingen-Weiler (DE); Jani Matti Johannes Moilanen, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/308,244

(22) PCT Filed: May 8, 2014

(86) PCT No.: PCT/EP2014/059442
§ 371 (c)(1),
(2) Date: Nov. 1, 2016

(87) PCT Pub. No.: WO2015/169367
PCT Pub. Date: Nov. 12, 2015

(65) Prior Publication Data
US 2017/0054477 A1    Feb. 23, 2017

(51) Int. Cl.
*H04W 40/00* (2009.01)
*H04B 7/024* (2017.01)
(Continued)

(52) U.S. Cl.
CPC .......... *H04B 7/024* (2013.01); *H04J 11/0093* (2013.01); *H04L 47/29* (2013.01); *H04W 16/10* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 8,983,470 B1* | 3/2015 | Ryan | H04W 24/02 455/422.1 |
| 2012/0135771 A1* | 5/2012 | Futaki | H04B 7/024 455/509 |

(Continued)

FOREIGN PATENT DOCUMENTS

| | | |
|---|---|---|
| EP | 2408230 A1 | 1/2012 |
| EP | 2498530 A1 | 9/2012 |

OTHER PUBLICATIONS

"3rd Generation Partnership Project; Technical Specification Group Radio Access Network; Coordinated multi-point operation for LTE physical layer aspects (Release 11)", 3GPP TR 36.819, V11.2.0, Sep. 2013, pp. 1-70.

(Continued)

*Primary Examiner* — Moustapha Diaby
(74) *Attorney, Agent, or Firm* — Harrington & Smith (57) ABSTRACT

The present invention addresses method, apparatus and computer program product for dynamic cell clustering for Coordinated Multipoint operation. Clustering metric information defining relevant metrics for making cell clustering decision for Coordinated Multipoint operation are received from a network element serving a neighboring cell, and based on the received clustering metric information, it is decided whether to include the neighboring cell to a cluster for Coordinated Multipoint operation.

20 Claims, 5 Drawing Sheets

(51) Int. Cl.
*H04W 16/10* (2009.01)
*H04J 11/00* (2006.01)
*H04L 12/801* (2013.01)
*H04W 92/20* (2009.01)

(56) References Cited

U.S. PATENT DOCUMENTS

| | | | |
|---|---|---|---|
| 2012/0172076 A1* | 7/2012 | Seki | H04B 7/024 |
| | | | 455/509 |
| 2013/0021929 A1* | 1/2013 | Kim | H04B 7/024 |
| | | | 370/252 |
| 2013/0223272 A1* | 8/2013 | Tao | H04B 7/024 |
| | | | 370/252 |
| 2013/0267239 A1 | 10/2013 | Stancanelli et al. | |
| 2015/0056992 A1* | 2/2015 | Morita | H04W 72/0426 |
| | | | 455/435.1 |
| 2015/0065108 A1 | 3/2015 | Bedekar et al. | |
| 2015/0312893 A1* | 10/2015 | Prasad | H04B 7/024 |
| | | | 370/328 |

OTHER PUBLICATIONS

"New work item proposal for Further Enhancements to LTE TDD for DL-UL Interference Management and Traffic Adaptation", 3GPP TSG-RAN Meeting #58, RP-121772, CATT, Dec. 4-7, 2012, pp. 1-6.
"New WID Proposal: Inter-eNB CoMP for LTE", 3GPP TSG RAN Meeting #62, RP-132094, Samsung, Dec. 3-6, 2013, pp. 1-5.
International Search Report and Written Opinion received for corresponding Patent Cooperation Treaty Application No. PCT/EP2014/059442, dated Mar. 2, 2015, 9 pages.

* cited by examiner

9-cell non-overlapping cluster

DYNAMIC CELL CLUSTERING FOR COORDINATED MULTIPOINT OPERATION

RELATED APPLICATION

This application was originally filed as PCT Application No. PCT/EP2014/059442 filed May 8, 2014.

FIELD OF THE INVENTION

The present invention generally relates to wired and wireless communication networks, and more specifically relates to a method, apparatus and computer program product for enabling dynamic cell clustering for Coordinated Multipoint CoMP operations.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

In the course of LTE evolution, the use of Coordinated Multipoint CoMP operation, i.e. transmission/reception, has been proposed, so as to improve coverage and throughput. One approach of such CoMP operation is Multi-cell coordinated scheduling MuCCS, wherein the scheme thereof is a coordinated scheduling CS based CoMP technique that dynamically mutes cells on Radio Bands RBs based on a network-wide sum utility maximization framework.

However, the set of cells over which such joint optimization is done is usually pre-determined. For example, 3GPP has defined in the respective specifications thereof a 3-cell (intra-site) cooperation cluster and a 9-cell hard partitioned cooperating cluster. That is, any given cell in the network is part of at most one cluster of cells, and no two clusters overlap.

But this optimization over hard-partitioned cell clusters is not ideal, as not all of a user equipment's UE strong interferers may be taken into account when doing the joint optimization. Instead, it has been proposed in MuCCS to use overlapping "liquid" clusters for a distributed architecture implementation.

A "liquid" cluster is defined in a cell-specific manner, as the set of all neighboring cells that are strong interferers of some UE in that cell. Further, the fraction of UEs whose strong interferer is within the Liquid Cluster of their serving cells would thus be 100%. The "liquid" cluster of any one cell would in general be different from the "liquid" cluster of every other cell, and the "liquid" clusters of two cells may overlap.

A UE's CoMP measurement set which is a UE-specific set of cooperating cells is determined from out of the UE's serving cell's liquid cluster. Clusters are usually formed in a UE-centric or network-centric manner.

In UE-centric clustering, each UE chooses a small number of cells that give the greatest cooperation gain. In general, UE-centric clustering is, however, very complex from a scheduling point of view. Each base station eNB locally comes up with its own set of candidate "cooperating cluster" eNBs based on the UE measurements like Reference Signal Receive Power RSRP, Channel Quality Indicator CQI, etc.

In network-centric clustering the clustering is done in a static way, and hence the performance of boundary UEs can be compromised.

However, the above mentioned clustering approaches do not take into account practical limitations e.g. a non-ideal backhaul. In real networks, the cell locations/sizes are irregular, the load conditions are also very dynamic and the backhaul connections are also non-ideal, such as due to some backhaul delay and finite capacity. So, mechanisms are required to adaptively determine the appropriate "liquid cluster" of a cell that provides the maximum MuCCS gains taking the above factors into account.

Hence, in view of the above drawbacks, there is a need for improving cell clustering for Coordinated Multipoint operation, in particular for adaptively forming "liquid clusters" for a cell.

SUMMARY OF THE INVENTION

Therefore, in order to overcome the drawbacks of the prior art, it is an object underlying the present invention to provide dynamic cell clustering for Coordinated Multipoint CoMP operations.

In particular, it is an object of the present invention to provide a method, apparatus and computer program product for enabling dynamic cell clustering for Coordinated Multipoint CoMP operations.

According to a first aspect of the present invention, there is provided a method, comprising receiving clustering metric information defining relevant metrics for making cell clustering decision for Coordinated Multipoint operation from a network element serving a neighboring cell, and deciding, based on the received clustering metric information, whether to include the neighboring cell to a cluster for Coordinated Multipoint operation.

According to a second aspect of the present invention, there is provided an apparatus, comprising a reception unit configured to receive clustering metric information defining relevant metrics for making cell clustering decision for Coordinated Multipoint operation from a network element serving a neighboring cell, and a processing unit configured to decide, based on the received clustering metric information, whether to include the neighboring cell to a cluster for Coordinated Multipoint operation.

According to a third aspect of the present invention, there is provided a method, comprising composing clustering metric information defining relevant metrics for making cell clustering decision for Coordinated Multipoint operation, and causing transmission of the clustering metric information to a network element of a neighboring cell.

According to a fourth aspect of the present invention, there is provided an apparatus, comprising a processing unit configured to compose clustering metric information defining relevant metrics for making cell clustering decision for Coordinated Multipoint operation, and a transmission unit configured to cause transmission of the clustering metric information to a network element of a neighboring cell.

According to a fifth aspect of the present invention, there is provided a computer program product comprising computer-executable components which, when the program is run, are configured to carry out the method according to the first aspect or according to the third aspect.

Advantageous further developments or modifications of the aforementioned exemplary aspects of the present invention are set out in the dependent claims.

According to certain embodiments of the present invention, the clustering metric information comprise at least one of information about a backhaul connection delay between the neighboring cell and the own cell, information about a backhaul connection capacity and/or bandwidth available for message exchange between the neighboring cell and the own cell, backhaul load, congestion in the backhaul, cost for exchanging this information over the backhaul, Quality of service QoS provided to the message exchange and information about Reference Signal Received Power measurements of a user equipment in the neighboring cell for the own cell and/or their reported Channel Quality Indicator values and/or the number (or fraction) of hand-ins/hand-outs from/to the neighbors.

Thereby, the clustering metric information may further comprise information about at least one of a coupling gain (or loss) between the neighboring cell and the own cell, the number (or fraction) of cell-edge Coordinated Multipoint enabled user equipments in the neighboring cell, the number (or fraction) of cell-edge Coordinated Multipoint enabled user equipments in the neighboring cell that consider the own cell as one of its top M interferers, where M>=1, and an increase in sum utility of user equipments in the neighboring cell due to a cooperation with the own cell.

Further, according to certain embodiments of the present invention, the clustering metric information is received from all neighboring cells, and the decision whether to include each respective neighboring cell is based on the clustering metric information of all neighboring cells.

Further, according to certain embodiments of the present invention, the transmission of the clustering metric information is initiated by transmitting a cluster inclusion response message to the neighboring cell upon reception of a cluster inclusion request message from the neighboring cell.

Further, according to certain embodiments of the present invention, if the cluster inclusion response message denies to include the neighboring cell in the CoMP cluster of the own cell, then the neighboring cell does not send further cluster inclusion request messages to the own cell for a predetermined duration.

Thereby, at least one of the cluster inclusion request, the cluster inclusion response, and the clustering metric information may include a timestamp for detecting the backhaul delay.

Further, according to certain embodiments of the present invention, when it is decided to include the neighboring cell to the cluster, a cluster selection decision message indicating the intention to include the neighboring cell to the cluster is transmitted to the network element serving the neighboring cell.

According to certain embodiments of the present invention, upon reception of a response indicating acceptance to include the neighboring cell to the cluster, Coordinated Multipoint cooperation between the own cell and the neighboring cell is initiated.

Still further, according to certain embodiments of the present invention, when the own cell, based on the clustering metrics sent by a neighbor cell that is part of the Coordinated Multipoint cluster, realizes that the clustering metrics do not meet predetermined properties, a message indicating dropping the neighbor cell from the own cell's Coordinated Multipoint cluster is sent to the neighbor cell for causing, in the neighbor cell, reconfiguration of the Coordinated Multipoint set of its served user equipments to not include the own cell.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE or LTE-Advanced based system. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In particular, the following examples versions and embodiments are to be understood only as illustrative examples. Although the specification may refer to an, one, or some example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a telecommunication network comprises plural network elements, such as base stations BS, evolved NodeB's (eNB; i.e. base station in LTE environment), user equipments UE (e.g. mobile phone, smart phone, Computer, etc.), controllers, interfaces, etc, and in particular any equipment used in the provision of a telecommunications service.

A basic system architecture of a communication system where example versions and embodiments are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station, an access point or an eNB, which control a respective coverage area or cell (macro cell, small cell) and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

As already indicated above, the main object addressed in the present application is how to adaptively form "liquid clusters" for a cell.

Figure 1:
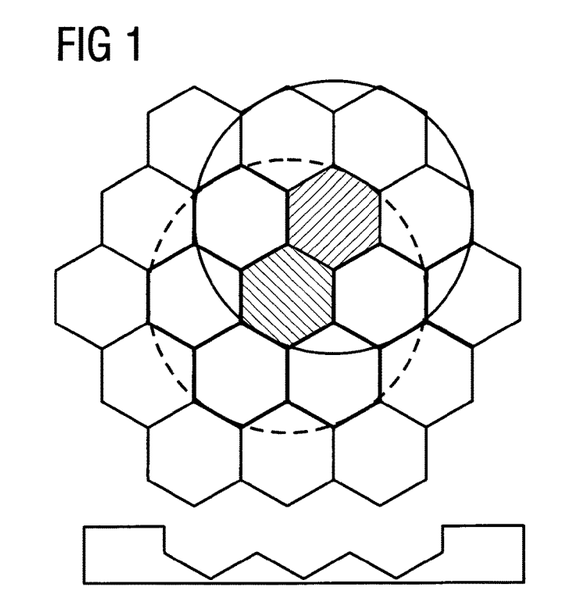
FIG. 1 schematically shows an example of a liquid cluster according to the prior art.
Figure 2:
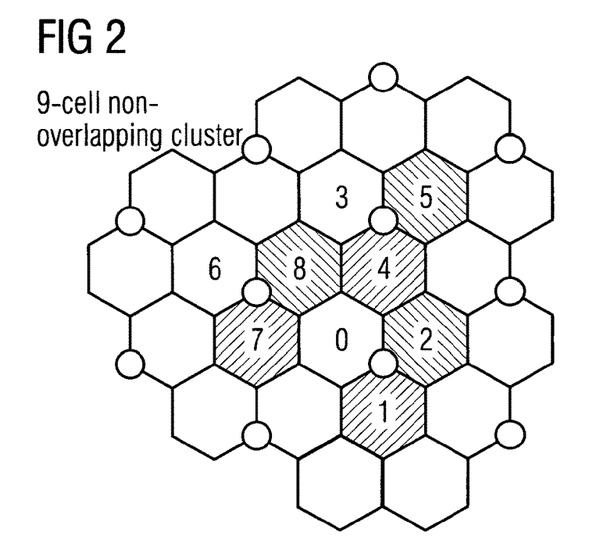
FIG. 2 schematically shows a 9 cell non-overlapping clustering according to 3GPP specifications.

Clusters are usually formed in a UE-centric or network-centric manner. An example of a liquid cluster for a regular hexagonal cell layout is shown in FIG. 1. The liquid cluster of the centre vertically hatched cell comprises of the six neighboring cells given within the bold circle. Likewise, the liquid cluster of the centre horizontally hatched cell comprises of the six neighboring cells given within the dashed circle. Furthermore, FIG. 2 schematically shows a 9 cell non-overlapping clustering according to 3GPP specifications (i.e. 3GPP TR 36.819, "Coordinated multipoint operation for LTE physical layer aspects", v. 11.2.0, September 2013) as one example thereof.

Basically, according to the present invention, an explicit signaling mechanism among neighboring eNBs (e.g. via X2) is provided, in which particular metrics required for making the cell clustering decisions are exchanged. In the following, such metrics are called the "clustering metrics".

Based on these "clustering metrics" obtained from the all the neighboring cells, the receiving cell determines its candidate "liquid cluster" cells and then initiates cooperation with each of these candidate "liquid cluster" cells using an appropriate request and response message exchange.

According to certain embodiments, if a cell 1 is included in the liquid cluster of a cell 2, then the CoMP measurement set of the UEs in cell 1 can contain cell 2. Otherwise, the CoMP measurement set of none of the UEs in cell 1 should contain cell 2.

Thereby it is to be noted that, in general, cell 2 may include cell 1 in its liquid cluster, but the other way around need not be true. This may be, for example, because cell 1 is heavily loaded and cell 1 realizes a lot of value from cell 2's muting, but cell 2 is lightly loaded, and hence does not realize as much value from cell 1's muting.

Figure 3:
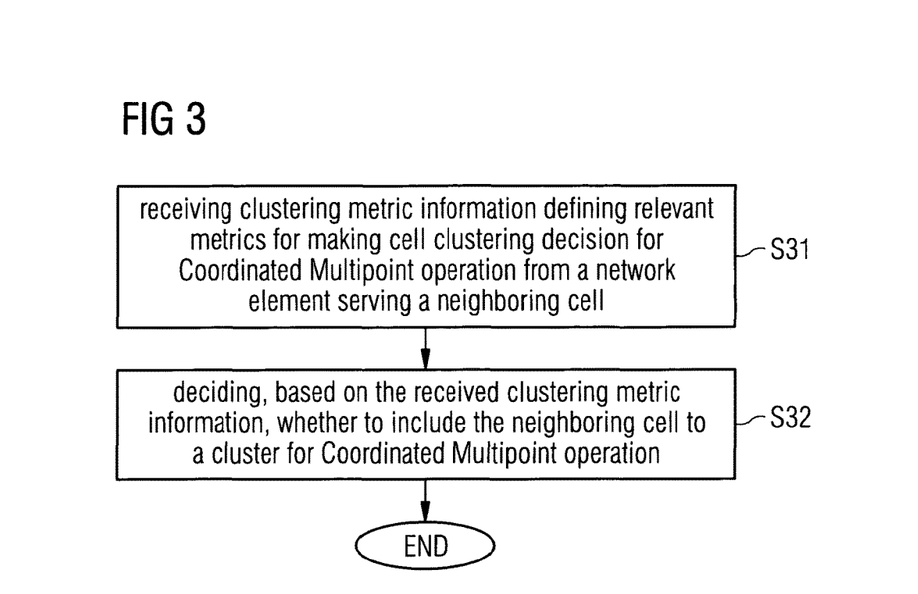
FIG. 3 illustrates a method according to certain embodiments of the invention, which may be performed by an element included in a base station serving a cell (an "own cell") surrounded by neighboring cell(s) in a cell-based communication network.

FIG. 3 shows a method according to some example versions of the disclosure, which may be performed by an element included in a base station serving a cell (an "own cell") surrounded by neighboring cell(s) in a cell-based communication network.

In Step S31, clustering metric information defining relevant metrics for making cell clustering decision for Coordinated Multipoint operation is received from a network element serving a neighboring cell.

Then, in Step S32, it is decided, based on the received clustering metric information, whether to include the neighboring cell to a cluster for Coordinated Multipoint operation.

Figure 4:
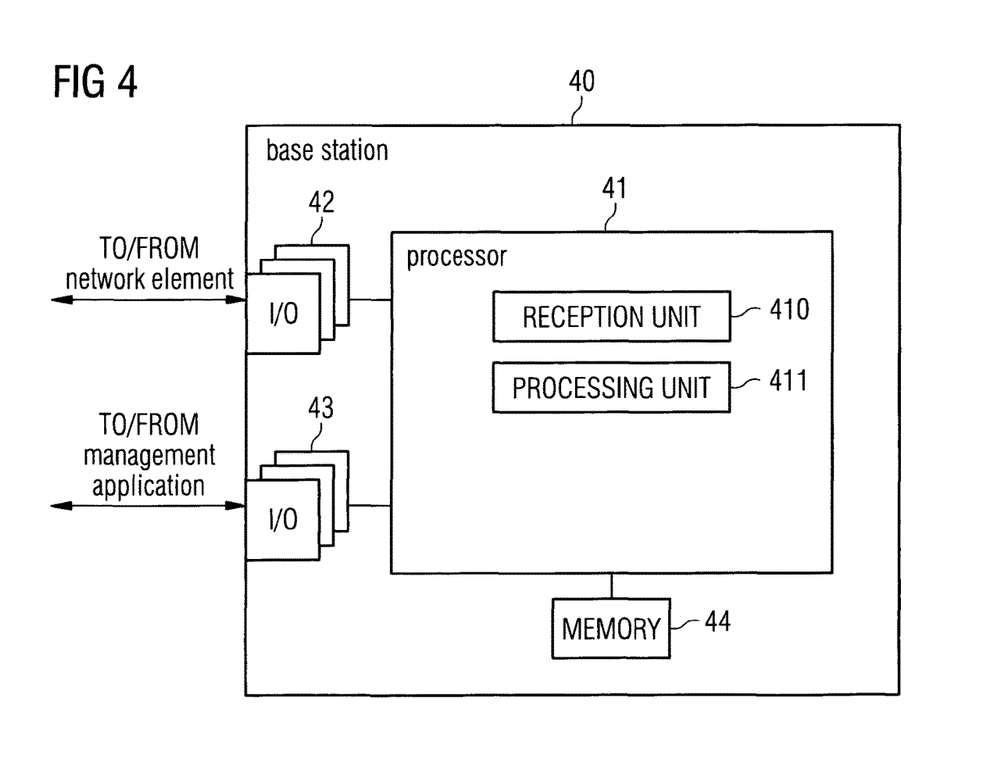
FIG. 4 schematically illustrates an apparatus according to certain embodiments of the invention.

In FIG. 4, a diagram illustrating a configuration of an element comprised in a (tele-) communication network element of a communication network according to some example versions of the disclosure is shown, which is configured to implement dynamic cell clustering for Coordinated Multipoint CoMP operations as described in connection with some of the example versions of the disclosure. The embodiment may be carried out in or by a network element. It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 40 shown in FIG. 4 may comprise a processing function, control unit or processor 41, such as a CPU or the like, which is suitable for executing instructions given by programs or the like related to the network element control procedure.

The processor 41 is configured to execute processing related to the above described dynamic cell clustering for CoMP operations. In particular, the processor 41 comprises a sub-portion 410 as a reception unit configured to receive clustering metric information defining relevant metrics for making cell clustering decision for Coordinated Multipoint operation from a network element serving a neighboring cell. The portion 410 may be configured to perform processing according to S31 of FIG. 3.

Furthermore, the processor 41 comprises a sub-portion 411 usable as a processing unit configured to decide, based on the received clustering metric information, whether to include the neighboring cell to a cluster for Coordinated Multipoint operation. The portion 411 may be configured to perform processing according to S32 of FIG. 3.

Reference signs 42 and 43 denote transceiver or input/output (I/O) units (interfaces) connected to the processor 41. The I/O units 42 may be used for communicating with the network element. The I/O units 43 may be used for communicating with a management application. Reference sign 44 denotes a memory usable, for example, for storing data and programs to be executed by the processor 41 and/or as a working storage of the processor 41.

Figure 5:
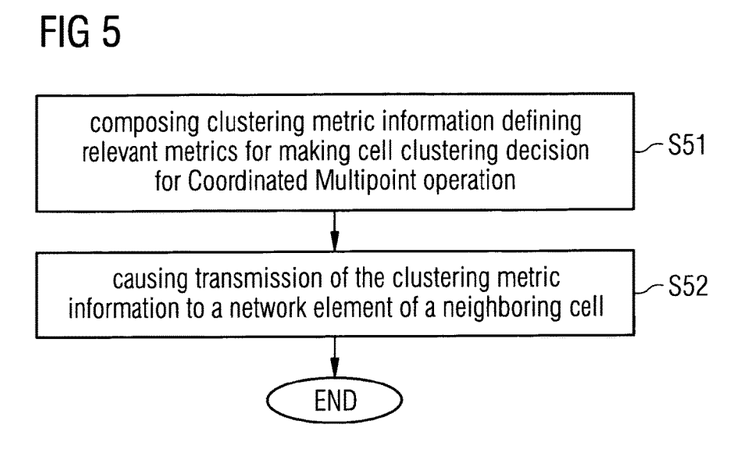
FIG. 5 schematically shows a method according to certain embodiments of the present invention, which may be performed by an element included in a base station serving a cell (an "own cell") which is a cell of cells surrounding a specific neighboring cell in a cell-based communication network.

FIG. 5 shows a method according to some example versions of the disclosure, which may be performed by an element included in a base station serving a cell (an "own cell") which is a cell of cells surrounding a specific neighboring cell in a cell-based communication network.

Further, in Step S51, clustering metric information defining relevant metrics for making cell clustering decision for Coordinated Multipoint operation is composed.

Finally, in Step S52, transmission of the clustering metric information to a network element of a neighboring cell is caused.

According to certain embodiments, composing the clustering metric information is initiated by a message indicating intention to form a cluster which is received from a network element of a neighboring cell. In other embodiments, this step may be skipped. Assuming the cell sending the clustering metric in Step S51 is not part of the CoMP cluster of own cell, composing the clustering metric information may be initiated when the metric composed in Step S51 is larger than some threshold (a first preset threshold), and/or the time since the last time the clustering metric was sent is more than a certain other threshold (a second preset threshold).

Figure 6:
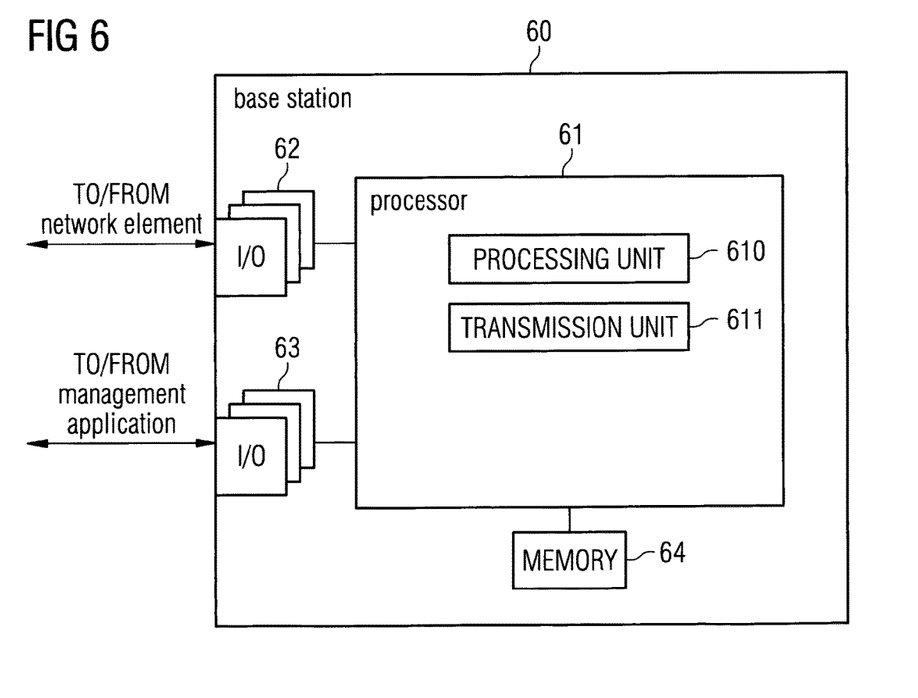
FIG. 6 schematically illustrates an apparatus according to certain embodiments of the invention.

In FIG. 6, a diagram illustrating a configuration of a network element of a communication network according to some example versions of the disclosure is shown, which is configured to implement dynamic cell clustering for CoMP operations as described in connection with some of the example versions of the disclosure. The embodiment may be carried out in or by a network element. It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or circuitry.

The network element 60 shown in FIG. 6 may comprise a processing function, control unit or processor 61, such as a CPU or the like, which is suitable for executing instructions given by programs or the like related to the network element control procedure.

The processor 61 is configured to execute processing related to the above described dynamic cell clustering for CoMP operations. In particular, the processor 61 comprises a sub-portion 610 as a processing unit configured to compose clustering metric information defining relevant metrics for making cell clustering decision for Coordinated Multipoint operation. The portion 610 may be configured to perform processing according to S51 of FIG. 5. Still further, the processor 61 comprises a sub-portion 611 usable as a transmission unit configured to cause transmission of the clustering metric information to a network element of a neighboring cell. The portion 611 may be configured to perform processing according to S52 of FIG. 5.

Reference signs 62 and 63 denote transceiver or input/output (I/O) units (interfaces) connected to the processor 61. The I/O units 62 may be used for communicating with the network element. The I/O units 63 may be used for communicating with a management application. Reference sign 64 denotes a memory usable, for example, for storing data and programs to be executed by the processor 61 and/or as a working storage of the processor 61.

According to certain embodiments, the present invention provides a messaging protocol for a cell to cooperate with its neighbors to determine its "liquid cluster". Thereby, the set of relevant neighboring cells that a cell cooperates with is determined, in order to make the local CoMP scheduling decisions (eg. muting or not). A signaling mechanism is provided to measure and include the backhaul delay and bandwidth constraints when making the clustering decisions.

Figure 7:
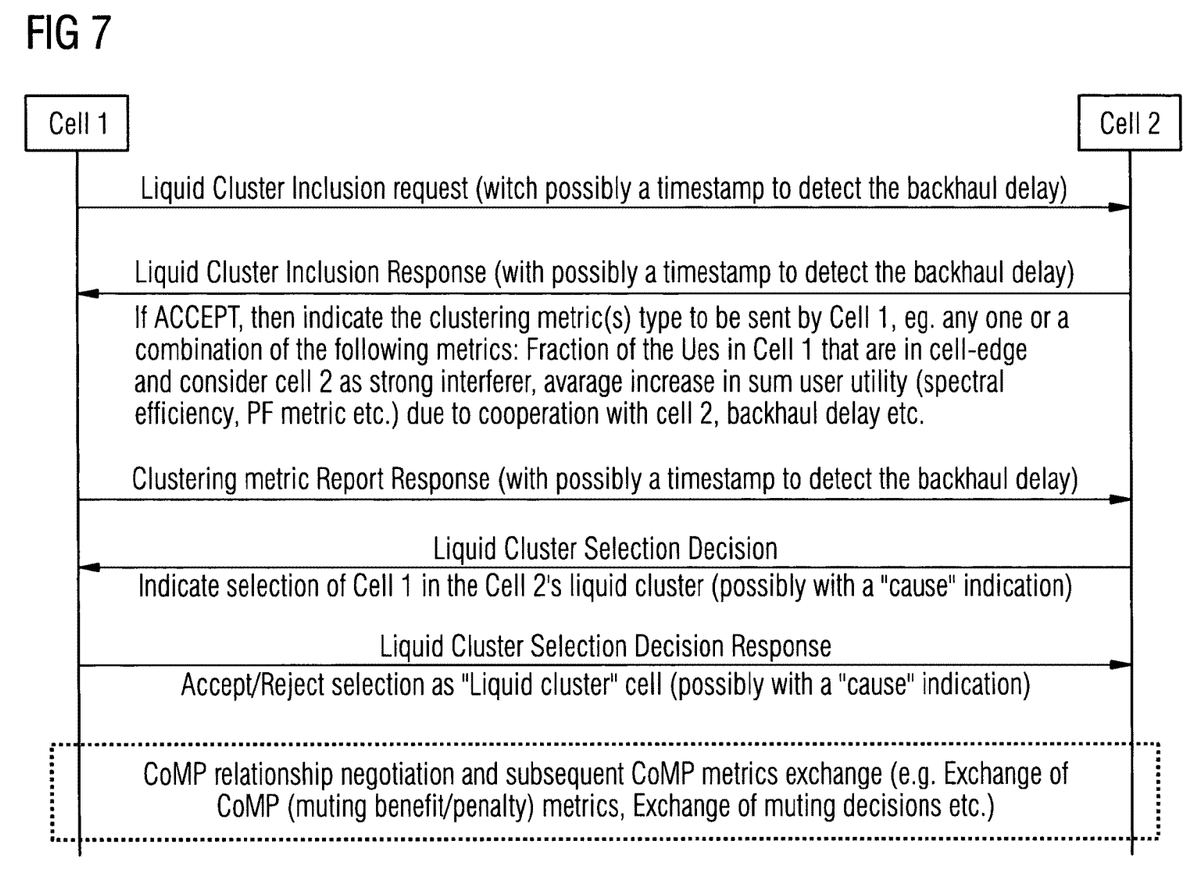
FIG. 7 shows a signaling message exchange according to certain embodiments of the invention.

A signaling message exchange between a Cell 1 and a Cell 2 according to certain embodiments of the invention is given in FIG. 7.

Firstly, Cell 1 determines that it can benefit by cooperation with Cell 2 (triggered by changes in X2 connection latency or bandwidth and/or local UE RSRP/CQI measurements, load in cell 1, QoS requirements of UEs in cell 1, number (or fraction) of hand-ins/hand-outs from/to cell 2) and initiates the procedure with a "Liquid Cluster Inclusion request".

Then, Cell 2 responds to the request and if accepted, then Cell 2 asks Cell 1 to send the required "clustering metrics", whereupon Cell 1 sends the required "clustering metrics" to Cell 2.

Then, based on the received "clustering metrics", e.g. from Cell 1 and from all other neighboring cells of cell 2, Cell 2 decides whether Cell 1 should be included in its liquid cluster or not.

Cell 2 then conveys the liquid cluster selection decision to Cell 1 and if selected Cell 1 sends an accept/Reject selection response back to Cell 2.

The "cause"-indications included in the registration request/accept messages can be used to indicate the reasons for including/rejecting a cell into the liquid cluster (for e.g. "large/less backhaul delay", "less/large backhaul capacity", "less/large cooperation benefit" etc.).

Figure 8:
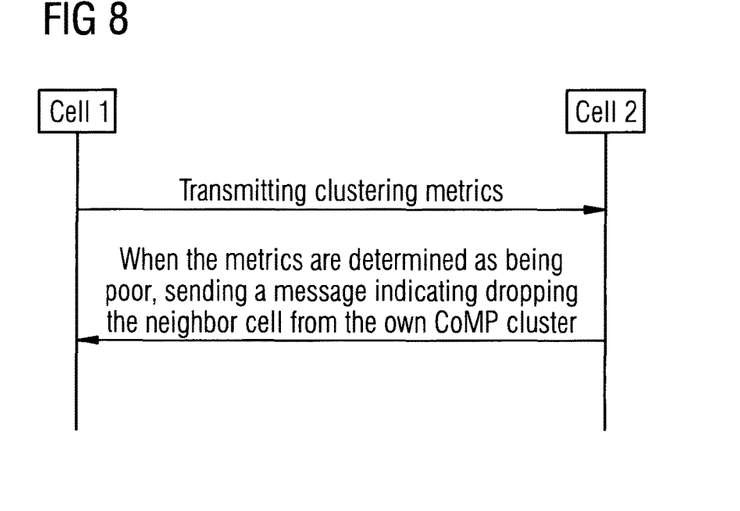
FIG. 8 shows a further signaling message exchange according to certain embodiments of the invention.

FIG. 8 shows subsequent message exchanges between Cell 1 and Cell 2 according to certain embodiments. In particular, FIG. 8 depicts the case, where cell 2 realizes that the clustering metric coming from cell 1 is poor and hence would like to exclude cell 1 from cell 2's cooperation cluster. In particular, the own cell, based on the clustering metrics sent by a neighbor cell that is part of the CoMP cluster, realizes that the clustering metrics are very poor (metrics do not meet predetermined properties) and sends a message to the neighbor cell dropping the neighbor cell from the own cell's CoMP cluster. The neighbor cell then reconfigures the CoMP set of its UEs to not include the own cell.

According to certain embodiments of the invention, the following variations therefore are applicable. In this regard, it is to be noted that the embodiments as well as the variations shown herein are merely intended to exemplify the present invention; but the present invention is not limited to the shown embodiments and variations.

A possible variation is that Cell 2 initiates the above procedure by requesting Cell 1 to send the required Clustering Request metrics.

Furthermore, the liquid cluster configuration using the above proposed signaling exchange may be done at initial setup, e.g. soon after reboot or after sufficient measurements are obtained. In addition, a reconfiguration update of the "liquid cluster" can be done periodically or triggered by changes in X2 latency/bandwidth, changes in cooperation benefits, switching off/on of neighboring cells etc.

Still further, though the above signaling mechanism is described for a distributed architecture implementation, it could also be executed in a centralized fashion, wherein the different cells communicate the clustering metrics to a centralized server, and the server makes the determination of the appropriate cell clustering (for overlapping or non-overlapping clusters). The server could be either a C-SON server, or a Centralized-RRM server in the context of C-RAN.

In the following, some exemplary possible clustering metrics according to certain embodiments of the invention are explained. It is to be noted that also any possible combination of the following metrics can be used as a "clustering metric". Thereby, it is to be noted that it is further assumed that Cell 1 computes the "clustering metric" to send to cell 2.

One example of a clustering metric may be based on backhaul connection delay between Cell 1 and Cell 2. A further example of a clustering metric may be based on backhaul connection capacity/bandwidth available for message exchange between Cell 1 and Cell 2. A still further example of a clustering metric may be based on Reference Signal Received Power RSRP measurements of the UEs in Cell 1 for Cell 2 and/or their reported Channel Quality Identifier CQI values.

According to certain embodiments, a "Cooperation benefit metric" may be calculated according to one or a combination of the following metrics:

Coupling gain between Cell '1' and Cell '2'.

Number (or fraction) of cell-edge CoMP enabled UEs in cell '1'. This can be computed based on the RSRP and/or CQI measurements from the UEs.

Number (or fraction) of cell-edge CoMP enabled UEs in cell '1' that consider cell 2 as one of its top M interferers where M>=1. This can be computed based on the RSRP and/or CQI measurements from the UEs.

increase in sum utility of UEs (eg. UE's utility is a function of its achieved data rate and its QoS weights) in cell 1 due to cooperation with cell 2. This can be done by averaging over all RBs. Specifically for MuCCS, this cooperation benefit metric in cell x may be defined as the difference between the utility realized when cell A is muted versus utility realized when cell A is not muted. The utility realized for non-GBR traffic is typically taken to be the proportional fairness metric of that UE/bearer.

In the following, non-limiting examples of possible use cases of the present invention are outlined.

In case of large backhaul delays, the liquid cluster of a cell tends to become entirely intra-site (which has no backhaul delay). So the CoMP performance with liquid clusters should gracefully degrade to that of the intra-site CoMP performance for networks with large backhaul delays.

Further, in case of limited processing power availability, only a few very relevant neighboring interfering cells (that provides maximum realizable CoMP gains) are chosen within the liquid cluster.

This can be achieved by ranking the neighboring cells based on the received "clustering metrics" and choosing the top 'K' of them. 'K' can be decided based on the computational processing power available.

According to the advantages provided by the present invention, the performance of MuCCS with different kinds of cooperation clusters (for ideal backhaul and full buffer traffic) is given below. MuCCS with liquid clusters provide much higher cell-edge gains than the static clustering schemes.

| Scheme | Average UE throughput (Mbps) | Cell-edge UE throughput (Kbps) | RB utilization (%) |
|---|---|---|---|
| No MuCCS baseline | 1.73 | 416.6 | 100 |
| Intra-site MuCCS | 1.75 (+1.1%) | 447 (+7.3%) | 94.9 |
| 3GPP 9-cell non-overlapping clusters MuCCS | 1.76 (+1.7%) | 460 (+10.4%) | 93.84 |
| MuCCS with "liquid clusters" | 1.78 (+2.9%) | 493 (+18.3%) | 90.1 |

Gains with bursty traffic for liquid clusters are much higher:

| Scheme | Average UE throughput (Mbps) | Cell-edge UE throughput (Mbps) | RB utilization (%) |
|---|---|---|---|
| No MuCCS baseline | 9.98 | 1.9 | 61 |
| 3GPP 9-cell non-overlapping clusters MuCCS | 10.29 (+3.1%) | 2.3 (+20.6%) | 57 |
| MuCCS with "liquid clusters" | 10.14 (+1.6%) | 2.57 (34.8%) | 56 |

Figure 9:
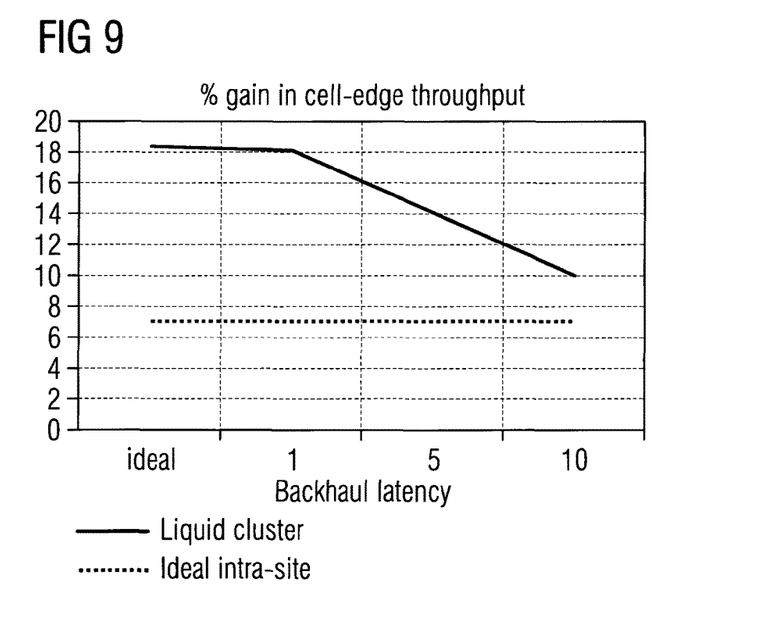
FIG. 9 is a graph indicating a MuCCS performance with increase in the backhaul delay according to certain embodiments of the invention.

Furthermore, FIG. 9 shows the MuCCS performance with increase in the backhaul delay. It is shown in FIG. 9 that it is important to configure the liquid cluster of a cell appropriately taking into account the backhaul delays of each link.

To summarize, the present invention provides an explicit signaling mechanism among the neighboring eNBs (eg. Via X2) in which the relevant metrics required for making the cell clustering decisions are exchanged. These metrics are called the "clustering metrics". Based on these clustering metrics obtained from the all the neighboring cells, the receiving cell determines its candidate liquid cluster cells, and then initiates cooperation with each of these candidate liquid cluster cells using an appropriate request and response message exchange.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under LTE™ or LTE-Advanced, and can advantageously be implemented also in controllers, base stations, user equipments or smart phones, or computers connectable to such networks. That is, it can be implemented e.g. as/in chipsets to connected devices.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

The following meanings for the abbreviations used in this specification apply:
LTE Long Term Evolution
CoMP Coordinated Multipoint
MuCCS Multi-cell coordinated scheduling
RB Radio Band
UE User Equipment
eNB evolved NodeB (base station in LTE)
CQI Channel Quality Indicator
RSRP Reference Signal Receive Power
3GPP 3rd Generation Partnership Project
QoS Quality of Service
DPS Dynamic Point Selection

What is claimed is:

1. A method for controlling an own cell, comprising:
receiving clustering metric information defining relevant metrics for making cell clustering decision for coordinated multipoint operation from a network element serving a neighboring cell, wherein the clustering metric information comprises a number or fraction of cell-edge coordinated multipoint enabled user equipments in the neighboring cell that consider the own cell as one of its top M interferers, where M>=1; and
deciding, based on the received clustering metric information, whether to include the neighboring cell to a cluster for coordinated multipoint operation.

2. The method according to claim 1, wherein the clustering metric information further comprises information corresponding to at least one of:
backhaul load,
congestion in the backhaul,
cost for exchanging the clustering metric information over the backhaul,
quality of service provided to the message exchange,
reference signal received power measurements of a user equipment in the neighboring cell and/or the own cell,
a reported channel quality indicator value of a user equipment in the neighboring cell and/or the own cell, and
at least one of: a number or fraction of hand-ins from neighbor cells, and a number or fraction of hand-outs to neighbor cells.

3. The method according to claim 1, wherein the clustering metric information is received from all neighboring cells, and the decision whether to include each respective neighboring cell is based on the clustering metric information of all neighboring cells.

4. The method according to claim 1, wherein the transmission of the clustering metric information is initiated by transmitting a cluster inclusion response message to the neighboring cell upon reception of a cluster inclusion request message from the neighboring cell.

5. The method according to claim 4, wherein, if the cluster inclusion response message denies to include the neighboring cell in the coordinated multipoint cluster of the own cell, then the cluster inclusion response message indicates to the neighboring cell to not to send further cluster inclusion request messages to the own cell for at least a predetermined duration.

6. The method according to claim 4, wherein at least one of the cluster inclusion request, the cluster inclusion response, and the clustering metric information includes a timestamp for detecting the backhaul delay.

7. An apparatus for controlling an own cell comprising:
at least one processor; and
at least one memory including computer program code;
the at least one memory and the computer program code configured to, with the at least one processor, cause the apparatus at least to:
receive clustering metric information defining relevant metrics for making cell clustering decision for coordinated multipoint operation from a network element serving a neighboring cell, wherein the clustering metric information comprises a number or fraction of cell-edge coordinated multipoint enabled user equipments in the neighboring cell that consider the own cell as one of its top M interferers, where $M>=1$; and
decide, based on the received clustering metric information, whether to include the neighboring cell to a cluster for coordinated multipoint operation.

8. The apparatus according to claim 7, wherein the clustering metric information further comprises information about at least one of:
backhaul load,
congestion in the backhaul,
cost for exchanging the clustering metric information over the backhaul,
quality of service provided to the message exchange,
reference signal received power measurements of a user equipment in the neighboring cell and/or the own cell,
a reported channel quality indicator value of a user equipment in the neighboring cell and/or the own cell, and
at least one of: a number or fraction of hand-ins from neighbor cells, and a number or fraction of hand-outs to neighbor cells.

9. The apparatus according to claim 8, wherein the clustering metric information further comprises information about at least one of:
a number or fraction of cell-edge coordinated multipoint enabled user equipments in the neighboring cell, and
an increase in sum utility of user equipments in the neighboring cell due to a cooperation with the own cell.

10. The apparatus according to claim 7, wherein the at least one memory and the computer program code are further configured to, with the at least one processor, cause the apparatus at least to:
receive clustering metric information from all neighboring cells, and to base the decision whether to include each respective neighboring cell is on the clustering metric information of all neighboring cells.

11. The apparatus according to claim 7, wherein the transmission of the clustering metric information is initiated by transmitting a cluster inclusion response message to the neighboring cell upon reception of a cluster inclusion request message from the neighboring cell.

12. The apparatus according to claim 11, wherein, if the cluster inclusion response message denies to include the neighboring cell in the coordinated multipoint cluster of the own cell, then the cluster inclusion response message indicates to the neighboring cell to not to send further cluster inclusion request messages to the own cell for at least a predetermined duration.

13. The apparatus according to claim 11, wherein at least one of the cluster inclusion request, the cluster inclusion response, and the clustering metric information includes a timestamp for detecting the backhaul delay.

14. The apparatus according to claim 7, wherein the at least one memory and the computer program code are configured to, with the at least one processor, cause the apparatus further to:
when the apparatus has decided to include the neighboring cell to the cluster, cause transmission of a cluster selection decision message indicating inclusion of the neighboring cell to the cluster to the network element serving the neighboring cell.

15. The apparatus according to claim 14, wherein, upon reception of a response indicating acceptance to include the neighboring cell to the cluster, coordinated multipoint cooperation between the own cell and the neighboring cell is initiated.

16. The apparatus according to claim 7, wherein, the at least one memory and the computer program code are configured to, with the at least one processor, cause the apparatus further to:
when the own cell, based on the clustering metrics sent by a neighbor cell that is part of the Coordinated Multipoint cluster, determines that the clustering metrics do not meet predetermined properties, cause transmission of a message indicating dropping the neighbor cell from the own cell's Coordinated Multipoint cluster to the neighbor cell, for causing, in the neighbor cell, reconfiguration of the coordinated multipoint set of its served user equipments to not include the own cell.

17. An apparatus comprising:
at least one processor; and
at least one memory including computer program code;
the at least one memory and the computer program code configured to, with the at least one processor, cause the apparatus at least to:
compose clustering metric information defining relevant metrics for making cell clustering decision for coordinated multipoint operation involving an own cell, wherein the clustering metric information comprises a number or fraction of cell-edge coordinated multipoint enabled user equipments in the neighboring cell that consider the own cell as one of its top M interferers, where $M>=1$; and
cause transmission of the clustering metric information to a network element of a neighboring cell.

18. The apparatus according to claim 17, wherein the clustering metric information comprises information about at least one of:
backhaul load,
congestion in the backhaul,
cost for exchanging the clustering metric information over the backhaul,
quality of service provided to the message exchange, and reference signal received power measurements of a user equipment in the neighboring cell and/or the own cell, a reported channel quality indicator value of a user equipment in the neighboring cell and/or the own cell, and at least one of: a number or fraction of hand-ins from neighbor cells, and a number or fraction of hand-outs to neighbor cells.

19. The apparatus according to claim 18, wherein the clustering metric information further comprises information about at least one of:

a number or fraction of cell-edge coordinated multipoint enabled user equipments in the own cell, and an increase in sum utility of user equipments in the own cell due to a cooperation with the neighboring cell.

20. The apparatus according to claim 17, wherein the at least one memory and the computer program code are further configured to, with the at least one processor, cause the apparatus at least to:

initiate composing the clustering metric information by at least one of:

receiving a message indicating a cluster is to be formed from the network element of the neighboring cell, detecting that the composed metric is larger than a first preset threshold, and the time since the last time the clustering metric was sent is longer than a second preset threshold.

* * * * *

UNITED STATES PATENT AND TRADEMARK OFFICE
CERTIFICATE OF CORRECTION

PATENT NO. : 10,320,449 B2
APPLICATION NO. : 15/308244
DATED : June 11, 2019
INVENTOR(S) : Natarajan et al.

Page 1 of 1

It is certified that error appears in the above-identified patent and that said Letters Patent is hereby corrected as shown below:

In the Claims

In Claim 10: Column 13, Line 66, delete "is"

In Claim 18: Column 14, Line 67, delete "and"

Signed and Sealed this
Twenty-seventh Day of August, 2019

Andrei Iancu
*Director of the United States Patent and Trademark Office*